3,056,168
METHOD OF MOLDING POLYETHER URETHANE FOAM ARTICLES
Samuel M. Terry, Ann Arbor, Mich., assignor to Stubnitz Greene Corporation, Adrian, Mich., a corporation of Michigan
Filed Mar. 31, 1959, Ser. No. 803,263
5 Claims. (Cl. 18—48)

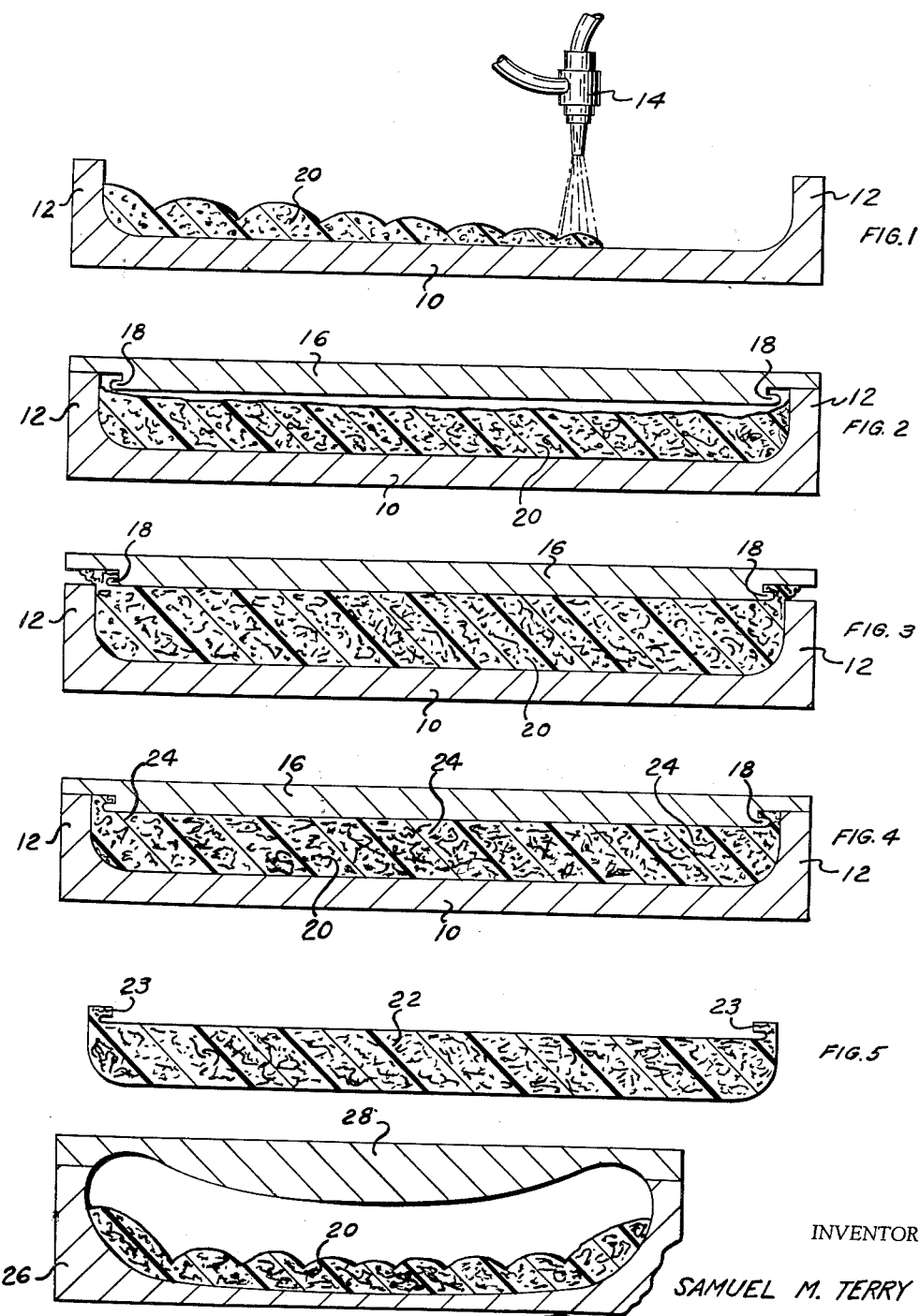

The invention relates to a method of molding articles of polyether urethane foams and particularly pertains to a method of molding such articles as to minimize internal tearing and the formation of internal defects.

The use of polyether urethane foams in seating pads, automobile seat topper pads, furniture cushions and the like is becoming widespread due to the strength, weight, wear and superior cushioning characteristics of urethane foams. However, due to the characteristics of the foam during the foaming process the variations of the consistency and the state of the foam over various portions of the mold often cause defects to occur which render the finished article unacceptable. As the polyether urethane foam is a reaction product of diisocyanates and hydroxyl containing resins of polyether-glycol, a catalyst, emulsifiers and water, these components are mixed at a nozzle immediately prior to the resulting mixture being introduced into the mold and it is not possible to introduce the mixture over the entire area of the mold at once to produce a foaming mixture of the same "age" throughout the mold and thus as the foam within the mold is at various stages of foaming and gelling it has been discovered that faults often occur when the foam is forced to flow laterally due to rigidly confining the foaming material within a closed top mold.

In the normal process of molding polyether urethane articles the lower half of the mold is passed back and forth beneath the mixing nozzle and shifted transversely after each pass to form a layer of active material in the mold. As the molds for automobile seats and the like are substantially large in area a minute or so may be required to charge the mold and foaming of the initially discharged mixture will begin before the mold is completely charged resulting in an expanding mass having an upper surface sloping in the direction of relative mixing nozzle and mold displacement. After the mold is charged the top portion of the mold is clamped in place and the foaming mixture will rise to engage the upper mold and conform to the configuration thereof. As the foam engages the upper mold the fact that the mixture surface is slightly sloped and that usually excessive foam material is introduced into the mold to insure that all of the mold cavities will be filled often results in a lateral, e.g. partially horizontal, flow of the foam causing foam in one stage of gelatinous form to intermingle with foam in a slightly different "age" and the cohesive nature of the foam will often cause the cells to adhere to each other and result in a homogeneous integral mass, however, it is not unusual that the lateral foam flow and the internal stresses caused thereby result in the formation of tears, void areas, hard spots, coarse cell formation and ragged edges which render the article commercially unacceptable.

If it were possible to very precisely regulate the amount of mixture introduced in the mold and exactly distribute the mixture in accordance with the mold configuration whereby the foaming action would cease just as the mold was filled the above described faults would rarely occur, however, such exact foam and mixture regulation is impractical and the invention discloses a method of molding which produces very acceptable results without such accurate regulation of the mixture amount and distribution and permits commercial production at a relatively low cost.

In practice, the invention comprises the steps of employing a mold having upper and lower portions defining a cavity having the configuration of the finished foam article, charging the lower portion of the mold with the activated foam mixture in a fluid state in an amount sufficient to slightly overfill the mold cavity at completion of the foaming, permit the mixture to foam freely in a vertical direction during evolution of the carbon dioxide until foaming is completed and then placing the upper mold portion in final position after the gelation of the foam has progressed to the point where the foam becomes dry to the touch. Placing the upper mold in position will compress the adjacent foam region and the state of the foam is such that the foam will readily conform to most cavity configurations without stressing or harming the structure of the foam. The upper mold portion is held in position until gelation is completed and the article may be removed from the mold, crushed in crushing rolls and then cured in the conventional manner.

The above described operation produces a superior foamed article because the foam is not vertically restricted during the foaming stages and hence lateral or cross mold flow due to engagement of the rising foam with a fixed upper mold portion is eliminated and the faults produced by such lateral flow are practically eliminated.

It has been found that the described procedure can be modified slightly by employing a relatively light weight upper mold top or portion and permitting the mold top to "float" or rise with the foam during evolution of the carbon dioxide. This procedure does not cause harmful vertical restriction of the foam but permits the foam in a "wet" state to better conform to the configuration of the top mold portion and permits forming of undercuts and overlapping lips adjacent the top mold.

An object of the invention is thus to provide a method of molding polyether urethane foam which minimizes internal faults in the foam and produces accurately formed finished articles.

Another object of the invention is to provide a method of molding polyether urethane foam which permits free expansion of the foam, minimizes horizontal foam flow and may be readily adapted to conventional molding apparatus.

These and other objects of the invention will become apparent when the invention is described with respect to the accompanying drawings wherein:

FIG. 1 is an elevational cross sectional view of a mold bottom partially covered by an activated foam mixture, FIG. 2 is a sectional elevational view of the top mold portion in position and the foam during expansion prior to engagement with the mold top, FIG. 3 is a sectional view of the mold at the completion of the foaming phase prior to compression, FIG. 4 shows the mold and foam after the mold top is repositioned on the lower mold portion and the foam is compressed during completion of gelation, FIG. 5 is a sectional view of the finished article, an automobile seat topper pad, and FIG. 6 is an elevational sectional view of a modification of mold design.

Referring to FIG. 1, the lower mold portion 10 is provided with upward extending sides 12 to define a substantially rectangular recess. The described mold is that used to produce automobile seat topper pads and the method of the invention is of particular advantage with similar articles of a high area to thickness ratio, however, it will be appreciated that the particular mold configuration is for illustrative purposes only.

The polyether urethane mixture is mixed with a catalyst at the nozzle 14 and deposited into the mold 10. As the foaming of the mixture is substantially in a vertical direction and the consistency of the mixture as discharged from the nozzle is a thick fluid state the mixture is distributed over the area of the mold recess or cavity by moving the nozzle and mold 10 relative to each other to distribute the mixture in parallel overlapping rows by employing a relative zig-zag motion. As viewed in FIG. 1, the first mixture now introduced into the mold is at the left and as the foaming begins to occur immediately upon mixing of the components in the nozzle 14 the mixture on the left will be slowly rising as the mixture is being applied to the right side of the mold.

In distributing the mixture in the mold those mold locations which require more foam than other regions due to greater thickness of the finished article are provided with a greater amount of mixture in the fluid state and in the illustrated seat topper more mixture is supplied around the periphery of the mold than at the center regions due to the snap-on lip as will be later described.

After the mixture is distributed over the area of the mold as desired, the mold top 16 is rested in position on the sides 12 of the lower mold 10, FIG. 2. Mold top 16 is provided with a relative planar lower surface which is formed with a peripheral lip 18 and is of a relatively light weight, as of wood.

As the foam 20 rises in the mold cavity the separate rows of mixture foam into an integral mass and the level of the upper foam surface will be slightly sloped in most cases. Upon rising to a height sufficient to contact the mold top the foam 20 will conform to the configuration of the mold top 16 and push or "float" the top 16 from the lower mold portion 10. Thus the mold top does not interfere with the rising of the foam due to the evolution of the carbon dioxide.

A sufficient amount of polyether urethane mixture is distributed into the mold 10 to slightly overfill the mold cavity defined by the upper and lower mold portions when in closed position, as in FIG. 2. Upon completion of the foaming the mold components will be related as in FIG. 3. It will be noted that while the foam is in the "wet" state of foaming and floating the mold top 16 the foam will flow around the lip 18 and intimately contact all of the mold 16 which forms a portion of the mold cavity.

After the complete evolution of carbon dioxide from the foaming mixture the foam gels and the mold components are left in the position of FIG. 3 until the foam gels to a relatively stiff consistency which is slightly sticky or tacky to the touch but will not cling to the finger. The foam usually reaches the proper consistency between 4 to 6 minutes after foaming is complete, however, this time interval will vary somewhat according to the shape of the mold and foam gel rate.

Upon the foam achieving the desired consistency the top mold 16 is clamped in position on the lower mold 10 as in FIG. 4 and the mold is maintained in this relation until gelation is complete and the finished seat topper pad 22 having a gripping edge 23 formed by lip 18, see FIG. 5, may be removed from the mold portions, crushed in crushing rolls and cured.

Upon clamping the mold top 16 in position the upper portion of the foam 20 will necessarily be compressed and although this compression will increase the density of the foam 20 in the region 24 adjacent the mold top 16 such compression is not harmful to the finished article and in effect provides a wear resistant layer adjacent the seat spring structure. It will be kept in mind that the amount of compression imposed on the foam in a gelatinous state is small as the foam only slightly overfills the mold cavity.

It is important that the compression of the foam by clamping mold top 16 in position be properly timed as premature compression will break down the cell structure of the foam if the foam is too "wet" causing hard spots and partial collapse of the foam. If the compression of the foam takes place too long a time after completion of foaming the consistency of the foam will be too high and the foam may tear away from the sides of the mold resulting in ragged edges.

It is not necessary in the practice of the invention that the top mold portion be floated on the rising foam, as in some mold forms, such as that shown in FIG. 6, the mixture may be distributed in the lower mold 26 and permitted to rise with the top mold portion 28 removed until foaming is completed whereupon the top 28 may be rested upon the overfilled foam mass to preliminarily shape the upper surface of the foam and upon the foam reaching the proper consistency the top 28 may be clamped in position on lower portion 26 as described above. This form of the invention is best employed where the finished article is of simple configuration free of intricate detailing.

In the practice of the invention the described foam material is a reaction product of poly propylene- oxy diols or triols or mixtures of diols and triols with diisocyanates to form a prepolymer which in turn is reacted with water in the presence of tertiary amines. By way of example the following formulation is provided to describe the prepolymer preparation.

|  | Parts by weight |
|---|---|
| Niax diol 2025 | 100.00 |
| Water | .30 |
| Tolylene diisocyanate (1st addition) | 10.50 |
| Heat @ 225–250° F., 3 hours. | |
| Cool to 180° F. | |
| Tolylene diisocyanate (2nd addition) | 27.00 |
| Water | 2.00 |
| N-methyl morpholine | 1.00 |
| Triethylamine | .25 |

This prepolymer is mixed with modifiers to form a "masterbatch," comprising:

|  | Parts by weight |
|---|---|
| Prepolymer | 100.00 |
| Dimethyl siloxane (50 c.s.t.) | .50 |
| Didecyl phthalate | 5.00 |

Tolylene diisocyanate (to adjust to desired concentration level 9.5±0.2 percent free NCO).

As the carbon dioxide gas is produced and rises, foaming is produced resulting in a cellular product which after gelation is crushed to break down a portion of the cells to decrease rigidity and then cured at approximately 250°–300° F. for about one hour.

It will be thus appreciated that the practice of the invention produces a consistently acceptable polyether urethane foam product and that production costs over conventional processes of molding may be materially reduced due to a decrease in defects caused during the expansion of the foam.

I claim:
1. A method of molding polyether urethane foam articles in a recessed cavity mold comprising distributing an amount of activated polyether urethane mixture within the mold cavity sufficient to slightly overfill the mold cavity upon completion of foaming, permitting said mixture to complete the foaming, and slightly compressing the foam to form the final desired article configuration while said foam is in a semi-gelatinous transitory state capable of limited compression without fracturing the cell structure having consistency characteristics intermediate the liquid flowing state of the expanding form and the state of a nonflowing gel.

2. A method of molding polyether urethane foam articles to their final form in a mold having upper and lower mold portions defining a mold cavity comprising the steps of distributing an amount of activated unfoamed polyether urethane mixture within the cavity of the lower mold portion sufficient to slightly overfill the entire mold cavity upon completion of foaming, permitting said mixture to freely foam and expand within the cavity and lifting said upper mold portion until the foaming is substantially complete, and then lowering the upper mold portion in position on the lower mold portion before gelling is complete and while the foam is in a semi-gelatinous tacky, nonadhesive to the touch transitory state thereby compressing the upper regions of the foam to conform to the configuration of the upper mold portion.

3. A method of molding polyether urethane foam as in claim 2 wherein said upper mold portion is positioned on the lower mold portion approximately 4 to 6 minutes after completion of foaming.

4. A method of molding polyether urethane foam articles to their final form in a mold having a lower portion and a upper portion defining a mold cavity comprising the steps of distributing an amount of activated unfoamed polyether urethane mixture within the cavity of the lower mold portion sufficient to slightly overfill the entire mold cavity upon foaming, resting the upper mold portion in position on said lower mold portion and permitting said upper mold portion to rise and float upon the rising foaming mixture and lowering and maintaining the upper mold portion in position on the lower mold portion after completion of the foaming of the mixture while said mixture is in a semi-gelatinous, dry to the touch transitory state having consistency characteristics intermediate the liquid flowing state of the expanding foam and the state of a nonflowing gel capable of limited compression without fracturing the cell structure thereby compressing the upper foam regions adjacent the upper mold portions to produce the final foam configuration.

5. A method of molding polyether urethane foam articles to their final form in a mold having a lower portion having spaced, opposed sides and ends and an upper portion defining a mold cavity, comprising the steps of distributing an amount of activated unfoamed polyether urethane mixture into the lower mold portion from one side to the opposing side in a plurality of rows extending from one end to the other end sufficient to slightly overfill the entire mold cavity upon complete foaming, resting the upper mold portion in position on said lower mold portion and permitting said upper mold portion to rise and float upon the rising expanding foaming mixture and lowering the upper mold portion in position on the lower mold portion after substantial completion of the foaming of the mixture while said mixture is in a semi-gelatinous, dry to the touch, transitory state having consistency characteristics intermediate the liquid flowing state of the expanding foam and the state of a nonflowing gel capable of limited compression without fracturing the cell structure thereby compressing the upper foam regions adjacent the upper mold portions to produce the final foam configuration.

References Cited in the file of this patent

UNITED STATES PATENTS

| | | |
|---|---|---|
| 2,442,940 | Staudinger et al. | June 8, 1948 |
| 2,525,965 | Smith | Oct. 17, 1950 |
| 2,575,259 | Cox et al. | Nov. 31, 1951 |

FOREIGN PATENTS

| | | |
|---|---|---|
| 539,786 | Great Britain | Sept. 24, 1941 |

OTHER REFERENCES

Satterly: K.P. Product Engineering, Foamed Isocyanates, February 1955, p. 140.